US010749795B2

(12) United States Patent
Shelar et al.

(10) Patent No.: US 10,749,795 B2
(45) Date of Patent: Aug. 18, 2020

(54) SYSTEMS AND METHODS FOR SELECTING COMMUNICATION PATHS FOR APPLICATIONS SENSITIVE TO BURSTY PACKET DROPS

(71) Applicant: Citrix Systems, Inc., Fort Lauderdale, FL (US)

(72) Inventors: Sachin Shelar, Bengaluru (IN); Praveen Raja Dhanabalan, Bengaluru (IN); Surya Prakash Patel, Bengaluru (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 98 days.

(21) Appl. No.: 16/028,861

(22) Filed: Jul. 6, 2018

(65) Prior Publication Data
US 2020/0014619 A1 Jan. 9, 2020

(51) Int. Cl.
*H04L 12/28* (2006.01)
*H04L 12/725* (2013.01)
*H04L 12/26* (2006.01)
*H04L 12/721* (2013.01)

(52) U.S. Cl.
CPC ...... *H04L 45/3065* (2013.01); *H04L 43/0829* (2013.01); *H04L 45/14* (2013.01); *H04L 45/302* (2013.01); *H04L 45/38* (2013.01)

(58) Field of Classification Search
USPC ....... 370/229, 230, 237, 248, 252, 351, 389, 370/216, 217, 218, 225, 241, 315, 394
See application file for complete search history.

(56) References Cited

U.S. PATENT DOCUMENTS

| | | | |
|---|---|---|---|
| 7,180,896 B1* | 2/2007 | Okumura | H04L 1/1628 370/394 |
| 8,213,453 B1* | 7/2012 | Voruganti | H04L 47/32 370/235 |
| 8,964,564 B2* | 2/2015 | Vasseur | H04L 45/02 370/237 |
| 2002/0105909 A1* | 8/2002 | Flanagan | H04L 29/06027 370/230 |
| 2005/0249123 A1* | 11/2005 | Finn | H04L 41/0677 370/242 |
| 2009/0003195 A1* | 1/2009 | Pitchforth, Jr. | H04L 41/0659 370/218 |
| 2013/0188478 A1* | 7/2013 | Kayser | H04L 41/0668 370/228 |

(Continued)

*Primary Examiner* — Nguyen H Ngo
(74) *Attorney, Agent, or Firm* — Foley & Lardner LLP

(57) ABSTRACT

Described embodiments provide systems and methods for selecting communication paths for applications sensitive to bursty packet drops. A device intermediary to a client and a server may identify an application for which packets are to be communicated between the client and the server. The device may determine a sensitivity level of the application to a network disruption affecting the packets. The device may estimate, for each path between the client and the server for communicating the one or more packets, a path quality for the path indicating a likelihood that the network disruption affects the one or more packets. The device may select path for communicating the packets based on the sensitivity level of the application and the path quality. The device may communicate the packets between the client and the server via the path.

18 Claims, 9 Drawing Sheets

(56) References Cited

U.S. PATENT DOCUMENTS

| | | | |
|---|---|---|---|
| 2015/0280975 A1* | 10/2015 | Bamba | H04L 45/22 |
| | | | 370/218 |
| 2016/0028608 A1* | 1/2016 | Dasgupta | H04L 43/16 |
| | | | 370/252 |
| 2016/0330106 A1* | 11/2016 | Menezes | H04L 45/22 |
| 2018/0367445 A1* | 12/2018 | Bajaj | H04L 43/04 |
| 2019/0036816 A1* | 1/2019 | Evans | H04L 43/08 |
| 2019/0036828 A1* | 1/2019 | Bajaj | H04L 41/5009 |

* cited by examiner

SYSTEMS AND METHODS FOR SELECTING COMMUNICATION PATHS FOR APPLICATIONS SENSITIVE TO BURSTY PACKET DROPS

FIELD OF THE DISCLOSURE

The present application generally relates to routing network packets, including but not limited to systems and methods for selecting communication paths for applications sensitive to bursty packet drops.

BACKGROUND

Packet loss may detrimentally impact the performance of applications accessing resources over networks. The effects of packet loss may be exacerbated when the data packets travel through multiple network nodes. Each node may potentially contribute to the delay of the data packet from the source to the destination, resulting in a cascading effect.

BRIEF SUMMARY

This summary is provided to introduce a selection of concepts in a simplified form that are further described below in the Detailed Description. This summary is not intended to identify key features or essential features, nor is it intended to limit the scope of the claims included herewith.

Intermediary devices deployed between clients and servers may collect real-time information on packets crisscrossing across multiple communication paths between the clients and the servers via a network (e.g., a software-defined wide-area network (SD-WAN)). The information collected by the intermediary devices for each communication path may include network performance statistics, such as packet loss, latency, delay variance (sometimes referred to as jitter), error rate, throughput, and bitrate, among others. Based on the network performance statistics, each intermediary device may rank communication path by performance. The intermediary device may select the communication path with the highest performance to transmit the data packets. Data packets from one of the clients may be sent to a client-side intermediary, travel via the communication path with the highest performance to a server-side intermediary, and then arrive at the destination server. Conversely, data packets from one of the servers may be sent to the server-side intermediary, travel via the communication path with the highest performance to the client-side intermediary, and then arrive at the destination client.

Despite the selection of the communication path with the highest performance, the loss of packets for short periods of time may severely degrade the performance of applications sensitive to such events. A loss of packets may be referred to as "bursty" when a chunk of packets (e.g., hundreds of packets) are dropped altogether over a short period of time (e.g., tens of seconds). A loss of packets may be referred to as "random," when the dropped packets are randomly distributed over an extended period of time (e.g., greater than 100 seconds). Bursty packet losses may affect the performance of the network and certain types of applications differently from random packet losses. For example, Voice over Internet Protocol (VOIP) applications may be particularly impacted by bursty packet drops. In such applications, even if the average packet loss rate for a call is relatively low (e.g., less than 1%), packet losses over a dense short time periods (e.g., over 300 packets within a 10 second span) may significantly decrease the quality of the call and the performance of the VOIP application. Other applications particularly affected by bursty packet drops may include video telephony, streaming, online gaming platforms, shared storage systems, and collaborative editors, among other real-time computing applications.

One technique to address some of the problems arising from bursty packet drops may be to employ forward error correction (FEC) and retransmit buffers to store packets at the intermediary devices. Under this technique, the intermediary device may temporarily store the packets in the buffer. In response to packet drops in the communication path through the network, the intermediary device may access the packets in the buffer, encode the packet using an error correcting code, and may retransmit the packets without notifying the client or the server. In this manner, the application may be shielded from the initial bursty packet drops. Furthermore, the use of FEC with retransmit buffer at the intermediary device may lead to better application performance due to reduction of latency and may also result in higher application throughput as the loss-based feedback is shielded.

Storing packets in the buffer at the intermediary and retransmitting from the intermediary, however, may still lead to degradation in the performance of applications sensitive to bursty packet drops. First, the unawareness of the clients and servers of the packet loss in the network may lead to degradation of network performance in the long run, because the clients and the servers may not take any countermeasures to address the packet loss. Without any feedback concerning the packet loss, the clients and servers may continue to increase transmission rate of data packets. The increase in transmission rates may result in overcapacity in the retransmit buffer at the intermediary device and continued bursty packet drops in the network. Second, without any feedback from the intermediary devices, the applications communicating via the network may be unaware of the packet loss and operate as if the network is properly functioning. This unawareness may lead to some applications (e.g., video streaming applications that use adaptive bitrate streaming) attempting to send packets consuming higher bandwidth. While more and more bandwidth is requested, the actual packet loss in the network may result in adversely affecting the quality of service (e.g., repeated stream buffering in the case of the video streaming applications).

To solve the challenges in performance degradation arising from bursty packet drops, the intermediary device under the present systems and methods may take into account the sensitivity of the application to bursty packet drops. Each intermediary device deployed between the clients and the servers may monitor packets traveling across the communication paths of the network and may collect network performance statistics of each path. By monitoring the packets, the intermediary device may detect a type of packet loss. The intermediary device may count a number of packets dropped over a time window (e.g., 5 to 30 seconds), which may be predefined. The intermediary device may compare the number of dropped packets over the time window to a threshold. When the number of dropped packets over a time window is greater than the threshold number, the intermediary device may determine the type of the packet loss as bursty. In contrast, when the number of dropped packets over a time window is less than or equal the threshold number, the intermediary device may determine the type of the packet loss as random. The intermediary device may also take into account how many number of time windows the number of dropped packets exceeds the threshold number in determining the type of packet loss.

Additionally, the intermediary device may parse the packets to identify for which application the packet is to be communicated via the network. The intermediary device may classify each application based on its sensitivity level to bursty packet losses. For example, applications reliant on real-time traffic (e.g., VOIP employing adaptive bitrate streaming) may be classified as having high sensitivity. Applications reliant on interactive traffic (e.g., messaging systems using the Messaging Application Programming Interface (MAPI) and file sharing services using the Common Internet File System (CIFS)) may be classified as having moderate sensitivity. Applications using bulky traffic (e.g., transferring files using File Transfer Protocol (FTP)) may be classified as having low sensitivity. The sensitivity level of the applications may be used to select which communication path of the network to send the packet through.

Using the sensitivity level of the application and the detected type of packet loss in each of the communication paths through the network, the intermediary device may select which communication path to send the packets. The intermediary device may set a threshold path quality in selecting the communication path through the network based on the sensitivity level of the application for the packets. For example, the threshold path quality for applications with high sensitivity may be 5 packets dropped over a time period (e.g., 5 to 30 seconds), whereas the threshold path quality for applications with low sensitivity may be 10 packets dropped over the time period. For each communication path, the intermediary device may determine a packet loss distribution of the communication path based on the network performance statistics aggregated for the communication path. Using the packet loss distribution, the intermediary device may determine an average packet loss rate for the path and a packet loss characteristic designating the path as having bursty or random loss. The intermediary device may then compare the threshold path quality set based on the sensitivity level of the application with the average packet loss rates determined for the communication paths. When there are multiple communication paths with average packet loss rates greater than the threshold path quality, the intermediary device may select the communication path using the sensitivity level of the application and the packet loss characteristic. For example, if two paths have the same average pack loss rate but the loss characteristic for the first path is bursty and for the second path is random, the intermediary device may select the first path for applications that are not sensitive to bursty packet drops and select the second path for applications that are sensitive.

With the selection of the communication path, the intermediary device may send the packets for the application over the communication path. Additionally, to minimize the effects of bursty packet drops in the communication path from the client and the server, the intermediary device may maintain a buffer for storing packets for the application. The intermediary device may retransmit a subset of the stored packets upon detecting a bursty packet drop in the communication path. Instead of releasing all the packets for retransmit from the buffer, the intermediary device may select a subset of packets to drop from the communication path based on the packet loss distribution therein. The number of packets marked for dropping may be proportional to the packet loss distribution. The higher the burstiness of the packet drops, the higher the number of the dropped packets may be. Conversely, the lower the burstiness of the packet drops, the lower the number of the dropped packets may be. The intermediary device may select the subset of packets to be randomly distributed over the time period to hide the burstiness of the packet drops in the communication path to the client or the server. In this manner, the effects of the bursty packet drops to the application may be minimized.

In one aspect, the present disclosure is directed to a method of selecting connection paths. A device intermediary to a client and a server may identify an application for which one or more packets are to be communicated between the client and the server. The device may determine a sensitivity level of the application to a network disruption affecting the one or more packets. The device may estimate, for each of a plurality of paths between the client and the server for communicating the one or more packets, a path quality for the path indicating a likelihood that the network disruption affects the one or more packets. The device may select, from the plurality of paths between the client and the server, a path for communicating the one or more packets based on the sensitivity level of the application and the path quality. The device may communicate the one or more packets between the client and the server via the path selected based on the sensitivity level and the path quality.

In some embodiments, identifying the application may include parsing the one or more packets received by the device to identify a traffic type for the application. In some embodiments, determining the sensitivity level of the application may include determining the sensitivity level of the application from a plurality of sensitivity levels based on the traffic type. Each of the plurality of sensitivity levels may correspond to one of a plurality of traffic types.

In some embodiments, determining the sensitivity level may include grouping the application to the sensitivity level of a plurality of sensitivity levels based on a traffic type of the application, the plurality of sensitivity levels including: a low-sensitivity level for traffic types with bulk data transfers, a medium-sensitivity level for traffic types with interactive network traffic, and a high-sensitivity level for traffic types with real-time network traffic In some embodiments, estimating the path quality may include calculating, for each of the plurality of paths, an average packet loss for the path by smoothing a packet loss distribution indicating a rate of the one or more packets dropped over a time period. In some embodiments, selecting the path from the plurality of paths may include selecting the path from the plurality of paths corresponding to the lowest average packet loss.

In some embodiments, the device may set a predetermined threshold for selection from the plurality of paths for the application based on the sensitivity level. In some embodiments, the device may compare, for each of the plurality of paths, the path quality to the predetermined threshold. In some embodiments, selecting the path from the plurality of paths may include selecting the path from the plurality of paths, responsive to determining that the path quality for the path is greater than the predetermined threshold.

In some embodiments, estimating the path quality may include estimating, for each of the plurality of paths, the path quality including at least one of: a packet loss distribution indicating a rate of the one or more packets dropped over a time period across the path; a latency indicating a delay rate in a transmission of the one or more packets across the path; and a jitter indicating a variance in the transmission of the one or more packets across the path In some embodiments, communicating the one or more packets may include storing, in a buffer, the one or more packets transmitted between the client and the server via the path. In some embodiments, communicating the one or more packets may include identifying, responsive to detecting a disruption event in the path, from the buffer, a subset of the one or more packets affected by the disruption event. In some embodiments, communicating the one or more packets may include retransmitting the subset of the one or more packets stored in the buffer via the path between the client and the server.

In some embodiments, the device may detect, while communicating the one or more packets, a disruption event interrupting communication of the one or more packets via the path between the client and the server. In some embodiments, the device may provide, responsive to detecting the disruption event in the path, a loss feedback indicator of the disruption event to at least one of the client and the server.

In some embodiments, the device may estimate, subsequent to communicating via the path, for each of the plurality of paths, a second path quality for the path indicating to the likelihood that the network disruption affects the one or more packets. In some embodiments, the device may select, from the plurality of paths, a second path for communicating the one or more packets based on the sensitivity of the application to network disruption and the second path quality. In some embodiments, the device may switch from the path to the second path for communicating subsequently received packets between the client and the server. In some embodiments, communicating the one or more packets may include communicating the one or more packets via the path between the client and the server through the device and a second device, the second device deployed intermediary between the device and the at least one of the client and the server.

In another aspect, the present disclosure is directed to a system for selecting connection paths. The system may include a service quality engine executable on a device intermediary to a client and a server. The service quality engine may identify an application for which one or more packets are to be communicated between the client and the server and to determine a sensitivity level of the application to a network disruption affecting the one or more packets. The system may include a path quality estimator executable on the device. The path quality estimator may estimate, for each of a plurality of paths between the client and the server for communicating the one or more packets, a path quality for the path indicating a likelihood that the network disruption affects the one or more packets. The system may include a path selector executable on the device. The path selector may select, from the plurality of paths between the client and the server, a path for communicating the one or more packets based on the sensitivity level of the application and the path quality. The system may include a routing engine executable on the device. The routing engine may communicate the one or more packets between the client and the server via the path selected based on the sensitivity level and the path quality.

In some embodiments, the service quality engine may parse the one or more packets received by the device to identify a traffic type for the application. In some embodiments, the service quality engine may determine the sensitivity level of the application from a plurality of sensitivity levels based on the traffic type, each of the plurality of sensitivity levels corresponding to one of a plurality of traffic types.

In some embodiments, the service quality engine may group the application to the sensitivity level of a plurality of sensitivity levels based on a traffic type of the application, the plurality of sensitivity levels including: a low-sensitivity level for traffic types with bulk data transfers, a medium-sensitivity level for traffic types with interactive network traffic, and a high-sensitivity level for traffic types with real-time network traffic.

In some embodiments, the path quality estimator may calculate, for each of the plurality of paths, an average packet loss for the path by smoothing a packet loss distribution indicating a rate of the one or more packets dropped over a time period. In some embodiments, the path selector may determine the path from the plurality of paths corresponding to the lowest average packet loss.

In some embodiments, the path selector may set a predetermined threshold for selection from the plurality of paths for the application based on the sensitivity level. In some embodiments, the path selector may compare, for each of the plurality of paths, the path quality to the predetermined threshold. In some embodiments, the path selector may select the path from the plurality of paths, responsive to determining that the path quality for the path is greater than the predetermined threshold.

In some embodiments, the path quality estimator may estimate each of the plurality of paths, the path quality including at least one of: a packet loss distribution indicating a rate of the one or more packets dropped over a time period across the path; a latency indicating a delay rate in a transmission of the one or more packets across the path; and a jitter indicating a variance in the transmission of the one or more packets across the path.

In some embodiments, the routing engine may store, in a buffer, the one or more packets transmitted between the client and the server via the path. In some embodiments, the routing engine may identify, responsive to detecting a disruption event in the path, from the buffer, a subset of the one or more packets affected by the disruption event. In some embodiments, the routing engine may retransmit the subset of the one or more packets stored in the buffer via the path between the client and the server.

In some embodiments, the routing engine may detect, while communicating the one or more packets, a disruption event interrupting communication of the one or more packets via the path between the client and the server. In some embodiments, the routing engine may provide, responsive to detecting the disruption event in the path, a loss feedback indicator of the disruption event to at least one of the client and the server.

In some embodiments, the path quality estimator may estimate, subsequent to communicating via the path, for each of the plurality of paths, a second path quality for the path indicating to the likelihood that the network disruption affects the one or more packets. In some embodiments, the path selector may select the path, from the plurality of paths, a second path for communicating the one or more packets based on the sensitivity of the application to network disruption and the second path quality and to switch over from the path to the second path for communicating subsequently received packets between the client and the server.

In some embodiments, the routing engine may communicate communicating the one or more packets via the path between the client and the server through the device and a second device, the second device deployed intermediary between the device and the at least one of the client and the server

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for virtualizing an application delivery controller;

Section D describes embodiments of systems and methods for providing a clustered appliance architecture environment; and Section E describes embodiments of systems and methods for selecting connection paths.

A. Network and Computing Environment

Figure 1A:
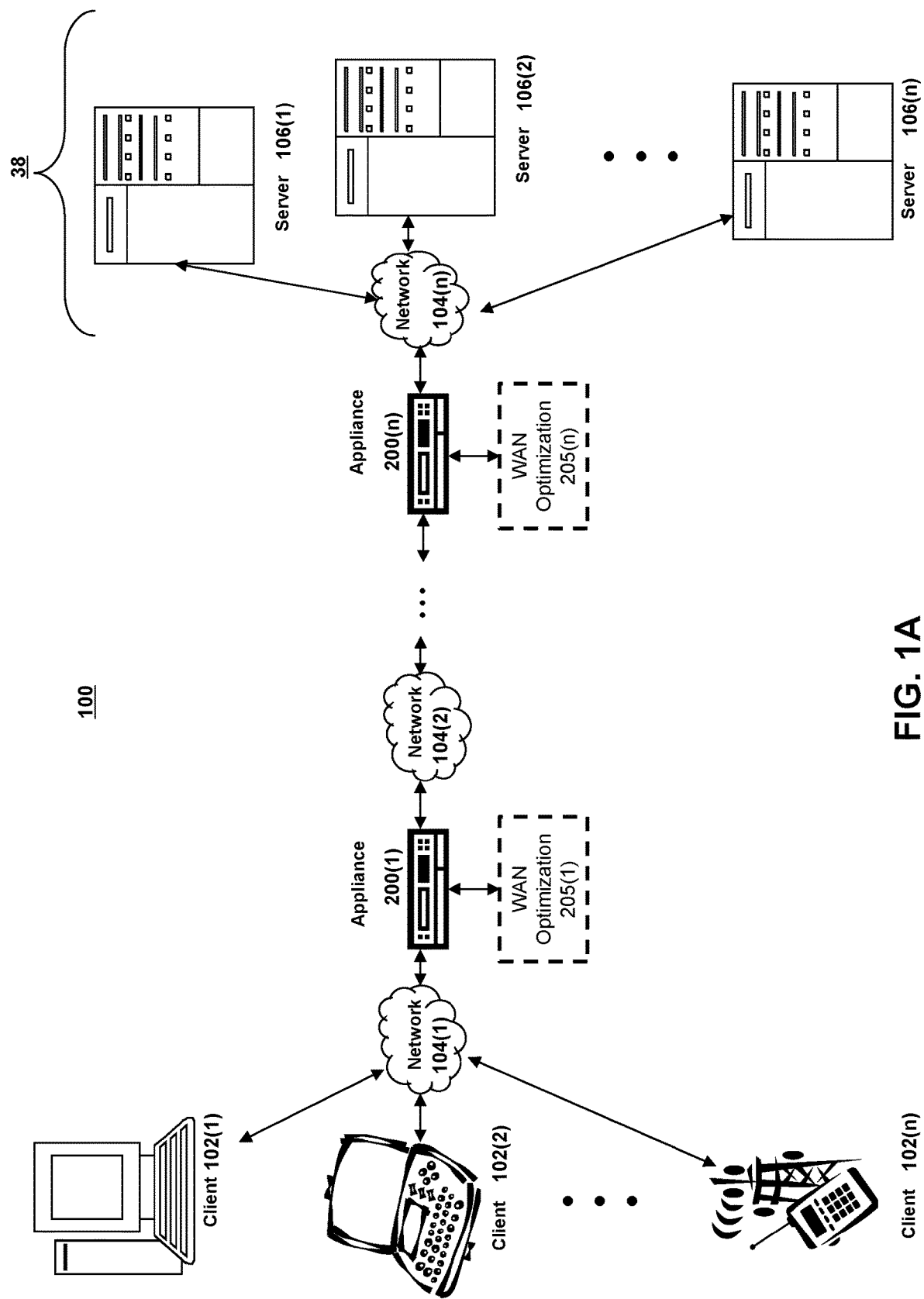
FIG. 1A is a block diagram of a network computing system, in accordance with an illustrative embodiment.

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as NetScaler® products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as CloudBridge® products sold by Citrix Systems, Inc. of Fort Lauderdale, Fla.

Figure 1B:
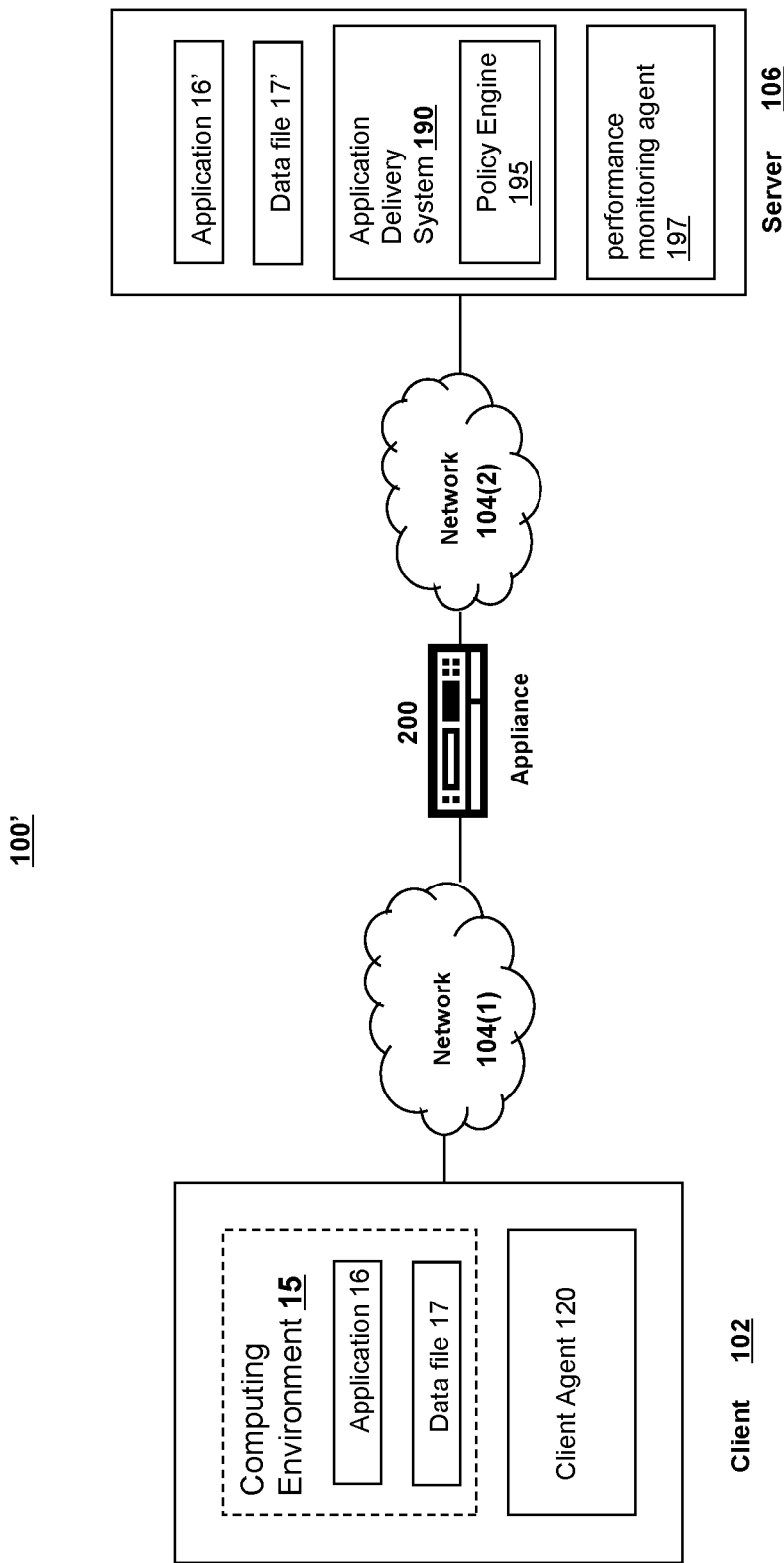
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered to the client 102 via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as XenApp® or XenDesktop®.

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 50 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliances 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as EdgeSight by Citrix Systems, Inc. of Fort Lauderdale, Fla.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
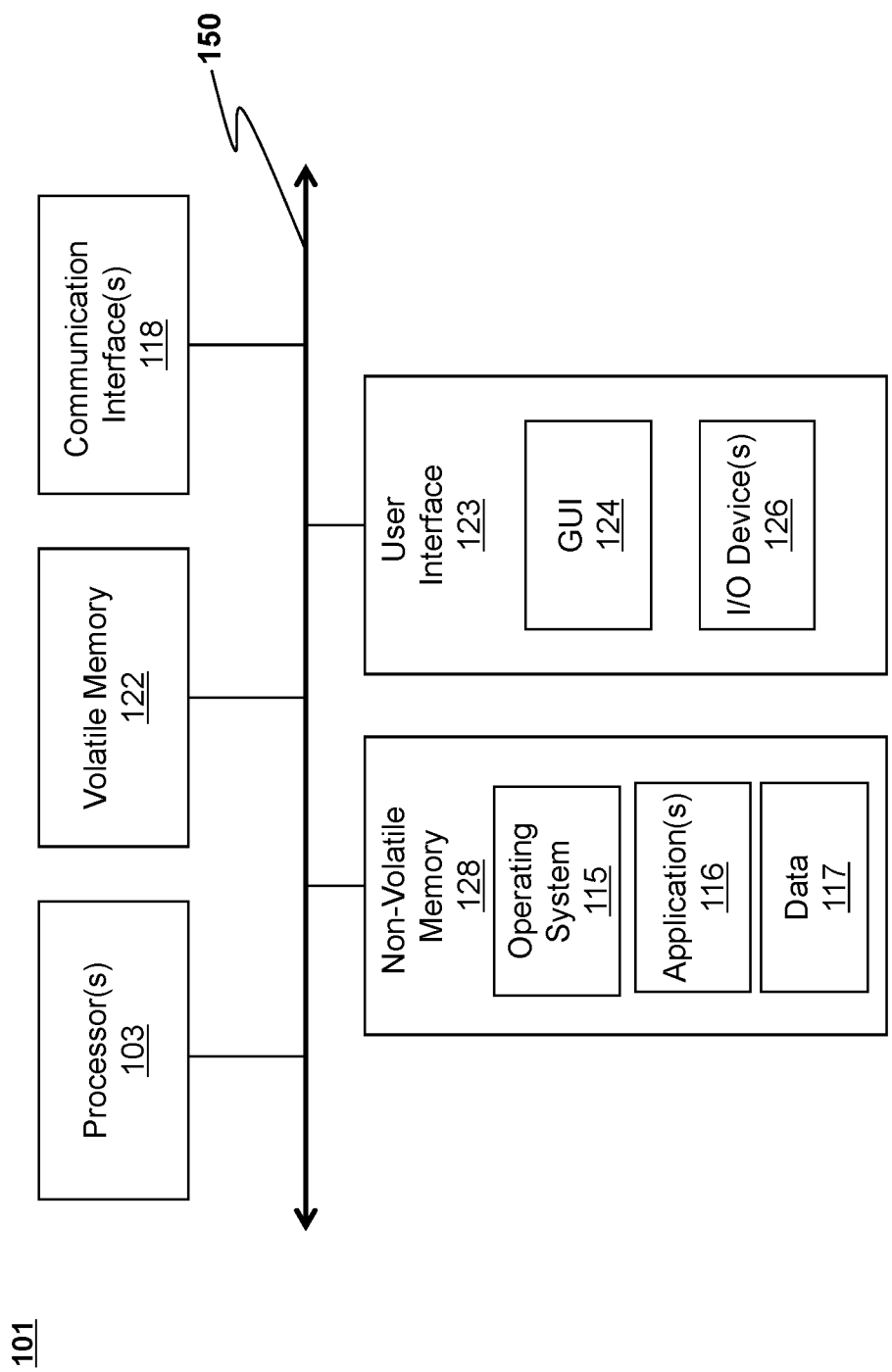
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150.

User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of network environment 100, clients 102, servers 106, and appliances 200 and 205 may be as described in U.S. Pat. No. 9,538,345, issued Jan. 3, 2017 to Citrix Systems, Inc. of Fort Lauderdale, Fla., the teachings of which are hereby incorporated herein by reference.

B. Appliance Architecture

Figure 2:
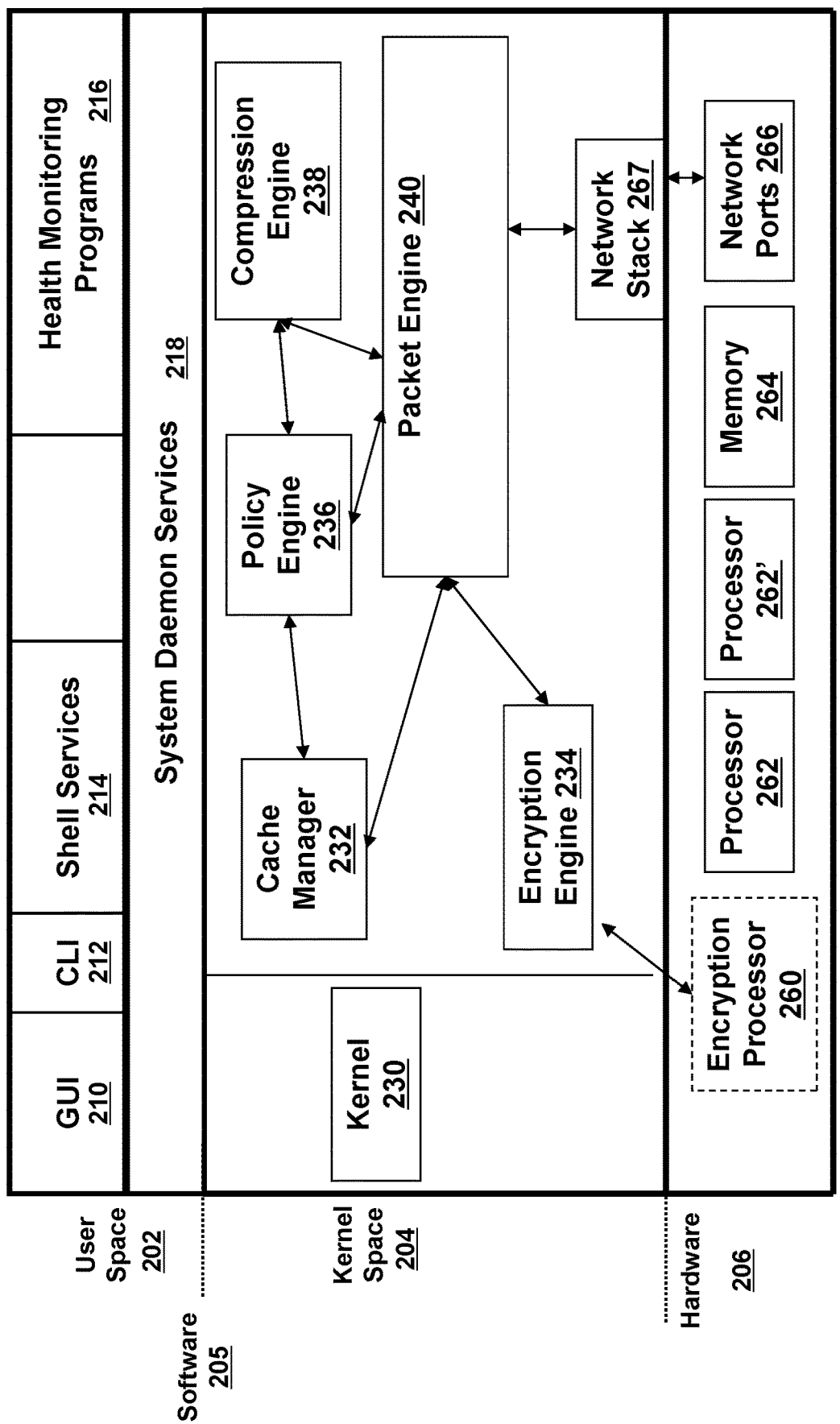
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reduce the access time of the data. In some embodiments, the cache manager 232 may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine whether a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layers connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

Additional details of the implementation and operation of appliance 200 may be as described in U.S. Pat. No. 9,538,345, issued Jan. 3, 2017 to Citrix Systems, Inc. of Fort Lauderdale, Fla., the teachings of which are hereby incorporated herein by reference.

C. Systems and Methods for Providing Virtualized Application Delivery Controller Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a XEN hypervisor, for example as provided by the open source Xen.org community. In an illustrative embodiment, device 302 executing a hypervisor that creates a virtual machine platform on which guest operating systems may execute is referred to as a host server. In such an embodiment, device 302 may be implemented as a XEN server as provided by Citrix Systems, Inc., of Fort Lauderdale, Fla.

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Figure 3:
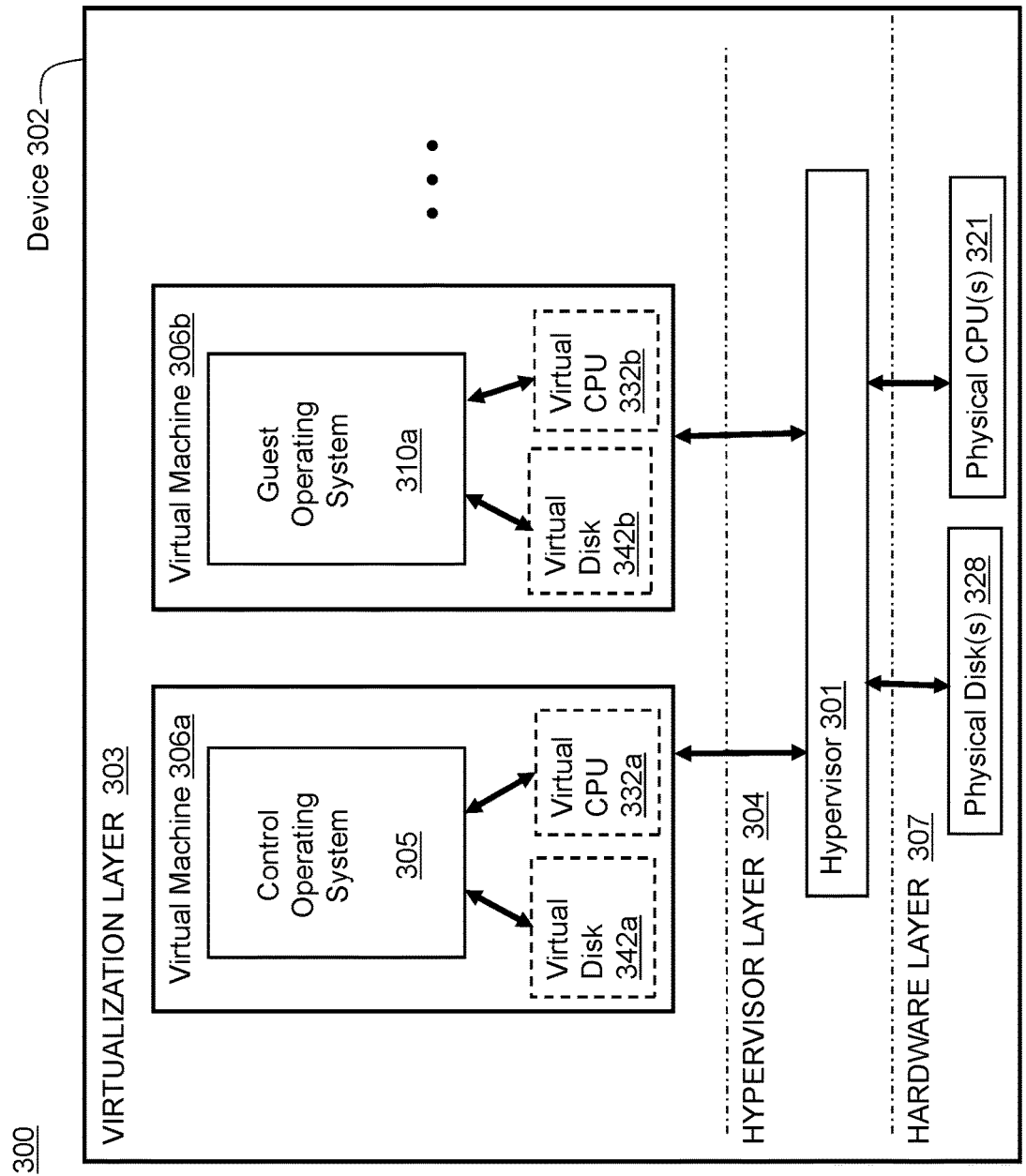
FIG. 3 is a block diagram of a virtualization environment, in accordance with an illustrative embodiment.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

Additional details of the implementation and operation of virtualized computing environment 300 may be as described in U.S. Pat. No. 9,538,345, issued Jan. 3, 2017 to Citrix Systems, Inc. of Fort Lauderdale, Fla., the teachings of which are hereby incorporated herein by reference.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

Additional details of the implementation and operation of a multi-processor and/or multi-core system may be as described in U.S. Pat. No. 9,538,345, issued Jan. 3, 2017 to Citrix Systems, Inc. of Fort Lauderdale, Fla., the teachings of which are hereby incorporated herein by reference.

D. Systems and Methods for Providing a Distributed Cluster Architecture

Figure 4:
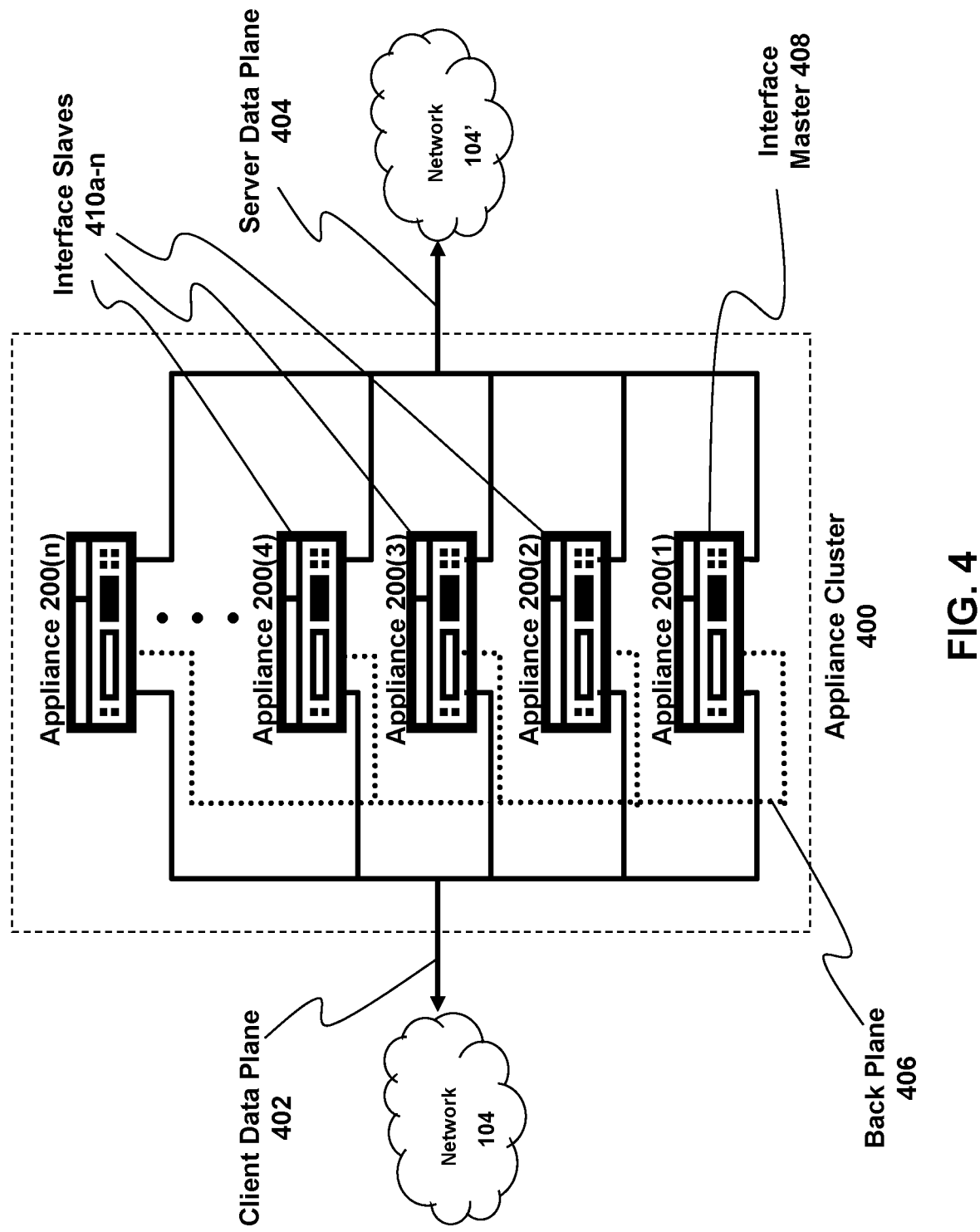
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a client-side network 104 via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104' via server data plane 404. Similarly to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or back plane 406. Back plane 406 may enable inter-node or inter-appliance control and configuration messages, for inter-node forwarding of traffic, and/or for communicating configuration and control traffic from an administrator or user to cluster 400. In some embodiments, back plane 406 may be a physical network, a VPN or tunnel, or a combination thereof.

Additional details of cluster 400 may be as described in U.S. Pat. No. 9,538,345, issued Jan. 3, 2017 to Citrix Systems, Inc. of Fort Lauderdale, Fla., the teachings of which are hereby incorporated herein by reference.

Figure 5A:
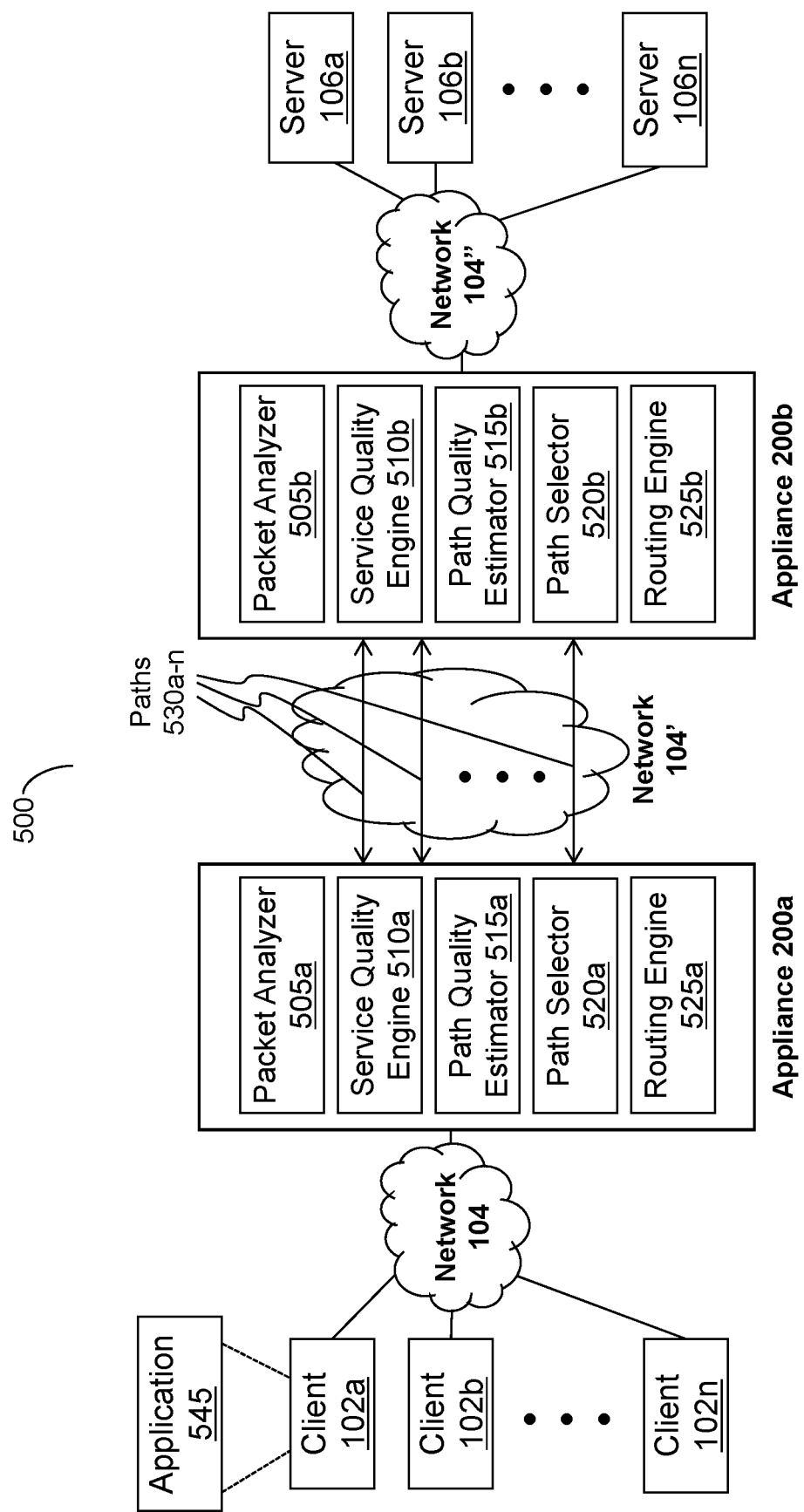
FIG. 5A is a block diagram of a system for selecting connection paths.

E. Systems and Methods for Selecting Communication Paths for Applications Sensitive to Bursty Packet Drops Referring now to FIG. 5A, depicted is a system 500 for selecting connection paths. In overview, the system 500 may include one or more clients 102a-n (hereinafter generally referred to as clients 102), one or more servers 106a-n (hereinafter generally referred to as servers 106), and one or more appliances 200a, 200b deployed between the clients 102 and the servers 106. The one or more clients 102 and at least one appliance 200a-n (e.g., a client-side appliance 200a) may be in communication with one another via a client-side network 104. In some embodiments, the one or more clients 102 may be running an application 545, and may reside at a branch office and the client-side network 104 may be a private network (e.g., a local area network (LAN) or wide area network (WAN)) between the clients 102 and the client-side appliances 200a. At least one appliance 200a-n (e.g., the client-side appliance 200a) and at least one another appliance 200a-n (e.g., a server-side appliance 200b) may be in communication with one another via an intermediary network 104'. In some embodiments, the intermediary network 104' may be a private network (e.g., a LAN or a software-defined wide area network (SD-WAN)) between the client-side appliances 200a and the server-side appliances 200b. Each appliance 200a-n may include a packet analyzer 505a-n, a service quality engine 510a-n, a path quality estimator 515a-n, a path selector 520a-n, and a routing engine 525a-n. The client-side appliance 200a and the server-side appliance 200b may be connected via one or more communication paths 530a-n through the intermediary network 104'. The one or more servers 106 and at least one appliance 200a-n (e.g., the server-side appliance 200b) may be in communication with one another via a server-side network 104". In some embodiments, the servers 106 may reside in a data center, and the server-side network 104" may be a private network (e.g., a local area network (LAN) or wide area network (WAN)) or a public network (e.g., the Internet) between the server-side appliances 200b and the servers 106.

Figure 5B:
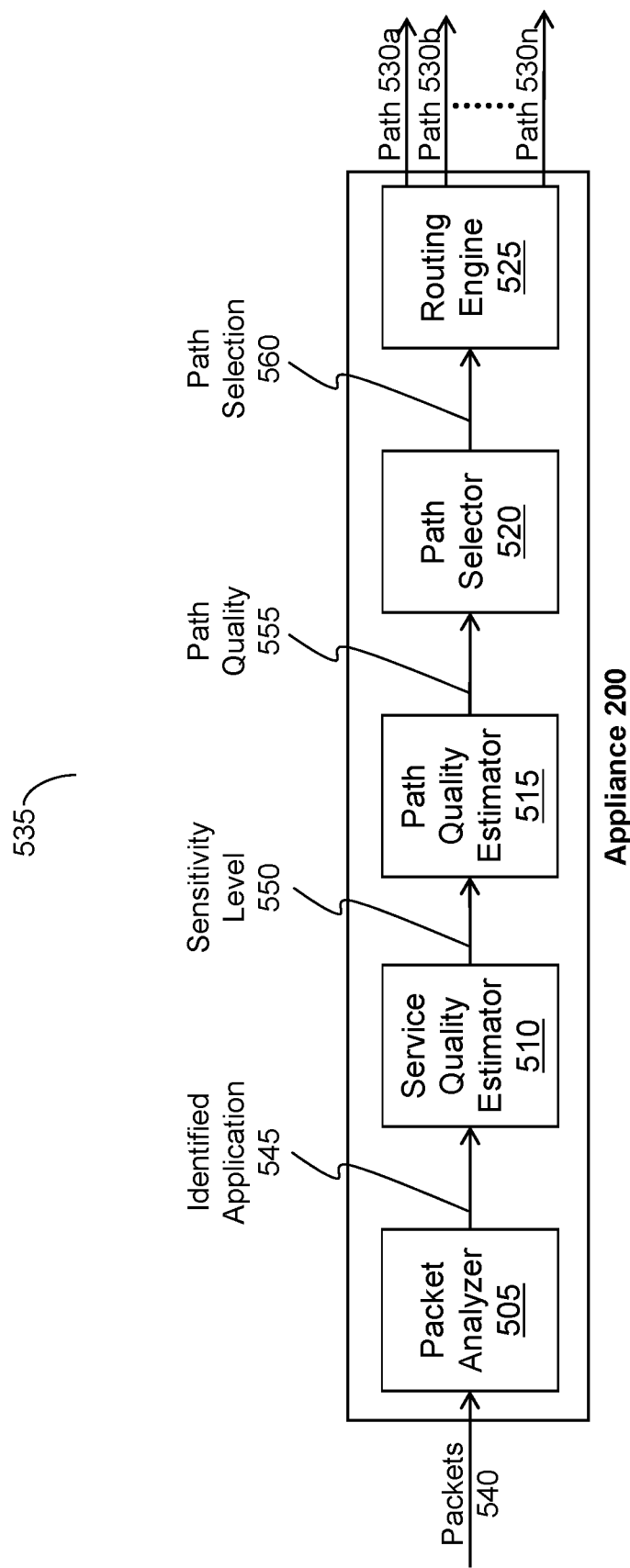
FIG. 5B is a communication diagram of an appliance in a system for selecting connection paths.

Referring also to FIG. 5B in conjunction with FIG. 5A, depicted is a communication diagram 535 of the appliance 200 in the system 500 for performing selecting connection paths. The appliance 200 depicted in the communication diagram 535 may be the client-side appliance 200a or the server-side appliance 200b. In overview, the packet analyzer 505 (generally referring to packet analyzer 505a-n executing on the client-side appliance 200a or the server-side appliance 200b) may receive packets 540 from one of the clients 102 or the servers 106, and may identify an application 545 associated with the packets 540. The service quality engine 510 (generally referring to service quality engine 510a-n) may determine a sensitivity level 550 for the application 545 associated with packets 540. The sensitivity level 550 for the application 545 may indicate a likelihood that the application 545 will be affected by network disruptions (e.g., bursty packet drops). The sensitivity levels 550 for certain applications 545, such as VOIP or streaming applications, may be determined to have a high level of sensitivity. In contrast, the sensitivity levels 550 for other applications 545, such as FTP file transfer applications, may be determined to have a low level of sensitivity. The path quality estimator 515 (generally referring to path quality estimator 515a-n) may determine a path quality 555 for each communication path 530a-n. Using the sensitivity level 550 for the application 545 and the path qualities 555 for the communication paths 530a-n, the path selector 520 (generally referring to the path selector 520a-n) may select one of the communications paths 530a-n to communicate the packets 540 to generate a path selection 560. The path selection 560 may indicate which of the communication paths 530a-n to communicate the packets 540. Using the path selection 560 specified by the path selector 520, the routing engine 525 (generally referring to the routing engine 525a-n) in turn may communicate the packets 540 via the selected communication path 530a-n.

The systems and methods of the present solution may be implemented in any type and form of device, including clients, servers and/or appliances 200. As referenced herein, a "server" may sometimes refer to any device in a client-server relationship, e.g., an appliance 200 in a handshake with a client device 102. The present systems and methods may be implemented in any intermediary device or gateway, such as any embodiments of the appliance or devices 200 described herein. Some portion of the present systems and methods may be implemented as part of a packet processing engine and/or virtual server of an appliance, for instance. The systems and methods may be implemented in any type and form of environment, including multi-core appliances, virtualized environments and/or clustered environments described herein.

In further detail, the packet analyzer 505 may identify the application 545 for which the one or more packets 540 are to be communicated between the client 102 and the server 106. The identification of the application 545 for the one or more packets 540 may be performed in response to a request from the client 102 to access resources hosted on the server 106 for the application 545. In some embodiments, the packet analyzer 505 executing on the client-side appliance 200a may intercept, receive, or otherwise identify the packets 540 from the client 102 via the client-side network 104 to be transmitted to the server 106. The application 545 executing on the client 102 may generate the one or more packets 540 to be transmitted to the server 106 to access resources for the application 545. The client 102 may transmit the packets 540 via the client-side network 104 to the client-side appliance 200a. In some embodiments, the packet analyzer 505 executing on the server-side appliance 200b may intercept, receive, or otherwise identify the packets 540 from the server 106 via the server-side network 104" to be transmitted to the client 102. In response to receiving packets 540 originating from the client 102, the server 106 may also generate packets 540 to be transmitted to the client 102 in connection with accessing of the resources hosted on the server 106 for the application 545.

Each packet 540 generated by the client 102 or the server 106 in connection with the application 545 may include a header and a body. The header of the packet 540 may include a source address, a source port, a destination address, a destination port, a protocol number, one or more options, and a checksum, among others. The source address or source port may correspond to one of the clients 102 or one of the server 106. The destination address or destination port may correspond to one of the clients 102 or one of the servers 106. The body of the packet 540 may include payload data, such as an identifier for the application 545 (e.g., a set of alphanumeric characters referring to the application 545), a request to access resources hosted on the server 106 for the application 545 (e.g., a function call), data from the resources hosted at the server 106 for the application 545 (e.g., return to the function call), and metadata for the application 545, among others. Each packet 540 may be in accordance with any number of communication protocols at any network layer, such as an Application Layer protocol (e.g., HyperText Transfer Protocol (HTTP)), a Transport Layer protocol (e.g., Transmission Control Protocol (TCP) and User Datagram Protocol (UDP)), and a Network Layer Protocol (e.g., Internet Protocol), among others.

With receipt of each packet 540, the packet analyzer 505 may parse the packet 540 to identify the application 545. In some embodiments, the packet analyzer 505 may parse the packet 540 to identify the header and the body. From the header of the packet 540, the packet analyzer 505 may identify the source address or port and the destination address or port. In some embodiments, using the source address or port of the packet 540, the packet analyzer 505 may determine whether the packet 540 is transmitted by the client 102 or the server 106. When the packet is determined to be transmitted by the server 106, the packet analyzer 505 may compare the source address or port with a set of source addresses or ports for accessing resources of the application 545. Each address or port may reference resources for the corresponding application 545. If there is a match between the source address or port from the packet 540 with one of the address or port for accessing resources of the application 545, the packet analyzer 505 may identify the application 545 corresponding to the matching address or port as the application 545. In addition, using the destination address or port of the packet 540, the packet analyzer 505 may determine whether the packet 540 is transmitted to the client 102 or the server 106. When the packet is determined to be transmitted to the server 106, the packet analyzer 505 may compare the destination address or port with a set of destination addresses or ports for accessing resources of the application 545. Each address or port may reference resources for the corresponding application 545. If there is a match between the destination address or port from the packet 540 with one of the address or port, the packet analyzer 505 may identify the application 545 corresponding to the matching address or port as the application 545.

From the body of each packet 540, the packet analyzer 505 may access or identify the payload data for the packet 540. Based on the payload data for the packet 540, the packet analyzer 505 may identify the application 545 for which the packet 540 is to be communicated. In some embodiments, the packet analyzer 505 may parse the payload data from the body of the packet 540 to identify the identifier for the application 545. Based on the identifier for the application 545, the packet analyzer 505 may identify the application 545 corresponding to the identifier for which the packet 540 is to be communicated between the client 102 and the server 106. In some embodiments, the packet analyzer 505 may parse the payload data from the body of the packet 540 to identify the metadata for the application 545. The metadata contained in the body of the packet 540 may contain the identifier for the application 545 or other information referencing the application 545. Using the metadata, the packet analyzer 505 may identify the application 545 corresponding to the reference for which the packet 540 is to be communicated between the client 102 and the server 106.

Additionally, the packet analyzer 505 may parse the packets 540 to identify or determine a traffic type for the application 545. The traffic type may characterize a level of reliance of the application 545 on the timely communication of the packets 540 for the proper functioning of the application 545. The traffic type for the application 545 may include real-time traffic, interactive traffic, and bulky traffic (also referred to as bulk data transfer), among others. Applications 545 reliant on real-time traffic may have a relatively steady stream of packets 540 in regular time intervals exchanged between the client 102 and the server 106. Applications 545 reliant on interactive traffic may have pairs of request and response packets 540 communicated between the client 102 and the server 106. Applications 545 reliant on bulky traffic may have uneven and relatively short transmissions of packets 540 between the client 102 and the server

106. In some embodiments, the packet analyzer 505 may determine the traffic type for the application 545 using the identifier parsed from the packets 540. The packet analyzer 505 may search a list of applications by traffic type using the identifier for the application 545. The list may specify the traffic types of each application 545 by identifier. For example, applications 545 associated with Voice over Internet Protocol (VOIP), real-time streaming media (using adaptive bitrate streaming), and gaming may be specified as real-time traffic dependent. Applications 545 associated with web browsing, instant messaging, and collaborative editing may be specified as interactive traffic reliant. Applications 545 associated with transferring of data files using the File Transfer Protocol (FTP) may be defined as bulky traffic dependent. Upon finding a match in the list, the packet analyzer 505 may identifying the traffic type specified in the list as the traffic type for the application 545.

In some embodiments, the packet analyzer 505 may use statistical analysis of the packets 540 to identify or determine the traffic type. The packet analyzer 505 may aggregate packets 540 received from the client 102 or the server 106 over a time window to identify the traffic type for the application 545. In some embodiments, the packets 540 may be aggregated by the packet analyzer 505 from existing connections between the client 102 and the server 106. In aggregating, the packet analyzer 505 may measure or identify a time of receipt of each packet 540. Using the aggregation of the packets 540, the packet analyzer 505 may determine a distribution of packets 540 over the time period. Based on the distribution of packets 540, the packet analyzer 505 may calculate a variance of the distribution over the time period. The packet analyzer 505 may compare the variance to a set of ranges of variances for the traffic type. The set of ranges may include a lower range of variance for the real-time traffic type, a middle range of variances for the interactive traffic type, and a higher range of variances for the bulky traffic type. If the variance of the distribution of the packets 540 for the application 545 is within the lower range, the packet analyzer 505 may identify the real-time traffic as the traffic type for the application 545 or stated differently, may identify the traffic type for the application 545 as real-time. If the variance of the distribution of the packets 540 for the application 545 is within the medium range, the packet analyzer 505 may identify the interactive traffic as the traffic type for the application 545 or stated differently, may identify the traffic type for the application 545 as interactive. If the variance of the distribution of the packets 540 for the application 545 is within the higher range, the packet analyzer 505 may identify the bulky traffic as the traffic type for the application 545 or stated differently, may identify the traffic type for the application 545 as bulky.

With the identification of the application 545 for which the one or more packets 540 are to be communicated, the service quality engine 510 may determine a sensitivity level 550 of the application 545 to a network disruption affecting the one or more packets 540. The network disruption may be characterized as random or bursty based on a distribution of packet losses over time. In general, the network disruption may be characterized as random when the distribution of the packet losses over time is relatively evenly distributed over an extended period of time. In contrast, the network disruption may be characterized as bursty when the distribution of packet losses over time is relatively concentrated to a short, episodic instant of time. The determination of whether the network disruption may be characterized as random or bursty is detailed herein below in conjunction with the functionalities of the path quality estimator 515. The operation of the application 545 may rely on exchanges of packets 540 between the client 102 and the server 106. The type of network disruption may affect the operations of applications 545 running on the clients 102. The sensitivity level 550 may measure or indicate a degree to which the functioning of the application 545 may be interrupted, disrupted, or otherwise affected by network disruptions. The sensitivity level 550 may be a numeric value (e.g., −1 to 1 or 0 to 100) or an alphanumeric identifier (e.g., "low," "medium" and "high") to enumerate the degree to which the application 545 may be affected by the network disruptions. In some embodiments, the sensitivity level 550 may further specify the type of network disruption (e.g., random or bursty) to which the application 545 may be affected.

Using the traffic type identified for the application 545, the service quality engine 510 may determine the sensitivity level of the application 545. Depending on the traffic type of the application 545, the type of network disruption may affect the functioning of the application 545 differently. For example, the operations of applications 545 that rely on real-time data (e.g., Voice over IP (VOIP)) may be severely interrupted by bursty network disruptions. By contrast, the operations of applications 545 that use bulky traffic (e.g., transferring files using File Transfer Protocol (FTP)) may face little impact from such bursty network disruptions. In some embodiments, the service quality engine 510 may identify the traffic type for the application 545 identified by the packet analyzer 505. Using the traffic type for the application 545, the service quality engine 510 may select or determine the sensitivity level 550 from a set of sensitivity levels. The set of sensitivity levels may include a low-sensitivity level for applications 545 with bulky traffic type, a medium-sensitivity level for applications 545 with interactive traffic type, and a high-sensitivity level for applications 545 with real-time traffic type. In some embodiments, the service quality engine 510 may map the traffic type for the application 545 with one of the set of sensitivity levels. In some embodiments, the service quality engine 510 may classify or group the application 545 to one of the set of sensitivity levels based on the traffic type for the application 545. The service quality engine 510 may group applications 545 with bulky traffic type to the low-sensitivity level, applications 545 with interactive traffic type to medium-sensitivity level, and applications 545 with real-time traffic type to high-sensitivity level.

For each communication path 530*a-n* through the intermediary network 104', the path quality estimator 515 may calculate, determine, or estimate a path quality 555 of the communication path 530*a-n*. The path quality 555 for the communication path 530*a-n* may indicate a likelihood that the network disruption affects the one or more packets 540 communicated between the client 102 and the server 106. In some embodiments, the path quality 555 for the communication path 530*a-n* may indicate a likelihood that the network disruption affects the one or more packets 540 communicated between the client-side appliance 200*a* and the server-side appliance 200*b*. The path quality 555 may also indicate whether the communication path 530*a-n* has a bursty network disruption or a random network disruption. The path quality 555 may also be a measure of a Quality of Service (QoS) of communication between the client 102 and the server 106 via the communication path 530*a-n*. The path quality 555 for the corresponding communication path 530*a-n* may include a network bandwidth (measured in bits per second), a latency, a variation in packet delay (sometimes referred to as jitter), a packet loss rate, error rate (sometimes referred to as bit error rate), or any other measures and any combination thereof. In calculating the path quality 555 for each communication path 530*a-n*, the path quality estimator 515 may determine a size (measured in bytes) of the packets 540 to be forwarded via the appliance 200.

In some embodiments, the path quality estimator 515 may determine the network bandwidth of each communication path 530 *a-n*. To determine the network bandwidth, the path quality estimator 515 may calculate a receive window size for a destination device and a return trip time for communications between the appliance 200 and the destination device via the communication path 530*a-n*. The destination device may include the client 102, the server 106, and the appliance 200 on the other side of the intermediary network 104'. For example, if the present instance of the path quality estimator 515 is on the client-side appliance 200*a*, the destination device may be the server-side appliance 200*b* or one of the servers 106. On the other hand, if the present instance of the path quality estimator 515 is on the server-side appliance 200*b*, the destination device may be the client-side appliance 200*a* or one of the clients 102. The path quality estimator 515 may calculate the return trip time for communications between the appliance 200 and the destination device via the communication path 530*a-n* using a ping test. In some embodiments, the path quality estimator 515 may estimate the network latency by calculating a predicted time elapsed between forwarding the packets 540 from the appliance 200 to the destination device via the communication path 530*a-n* and receiving a response from the destination device via the communication path 530*a-n*. In some embodiments, the path quality estimator 515 may estimate the variation in packet delay for communications between the appliance 200 and the destination device via the communication path 530*a-n* by measuring variations in network bandwidth over a predefined time window.

In estimating the path quality 555, the path quality estimator 515 may determine a distribution of packet loss in each communication path 530*a-n*. To determine the distribution of packet loss, the path quality estimator 515 may send test packets over the communication path 530*a-n* to the destination device, and may wait for a response (e.g., an acknowledgement) to each test packet from the destination device via the communication path 530*a-n*. The test packets may be sent in sequence over the communication path 530*a-n* over a time period (e.g., 1 to 5 minutes). For each test packet sent, the path quality estimator 515 may maintain a timer to measure a time elapsed since the sending of the test packet to wait for the response packet to the test packet from the destination device. The path quality estimator 515 may compare the elapsed time to a time threshold (e.g., a set time for timeout). If while waiting the elapsed time becomes greater than the time threshold, the path quality estimator 515 may determine an occurrence of a packet loss for the test packet. The path quality estimator 515 may also identify a time of transmission of the test packet as a time of packet loss, and may also increment a counter for keep track of a number of packets lost. Conversely, if the response packet is received within the time threshold, the path quality estimator 515 may determine no packet loss for the test packet. The path quality estimator 515 may also increment a counter for keep tracking of the number of response packets. Using the measurements for the test packets over the time period, the path quality estimator 515 may determine the distribution of packet loss over the communication path 530*a-n*. The distribution may include the number of responses, the number of packets lost, and times at which the packets were lost, among others. The distribution of packet loss may also indicate and may be used as the path quality 555 for the communication path 530*a-n*. Based on the number of packets lost in the communication path 530*a-n*, the path quality estimator 515 may calculate or determine an average packet loss (sometimes referred to as the mean packet loss).

In some embodiments, the path quality estimator 515 may smooth over the number of lost packets over the time period in calculating or determining the average packet loss for the communication path 530*a-n*. The path quality estimator 515 may apply one or more smooth algorithms to calculate or determine the average packet loss for the communication path 530*a-n*. In some embodiments, the average packet loss for the communication path 530*a-n* calculated or determined using the smoothing algorithms may be a moving average. The smoothing algorithms, for example, may include an additive smoothing algorithm, an exponential smoothing algorithm, a Kalman filter, a Butterworth filter, a smoothing spline estimator, and a kernel smoother, among others. In some embodiments, the path quality estimator 515 may apply the one or more smoothing algorithms over a time period (e.g., 5 seconds to 3 minutes) relative to a current time.

Using the distribution of packet losses, the path quality estimator 515 may determine the type of network disruption in the communication path 530*a-n*. As described previously, the network disruption in each communication path 530*a-n* may be characterized as random or bursty. In some embodiments, the path quality estimator 515 may calculate or determine a variance of the packet losses in the distribution over the time period. A low variance in the packet losses over the time period (e.g., loss of hundreds of packets within tens of seconds) may be indicative of a bursty network disruption. In contrast, a high variance in the packet losses may be indicative of a random network disruption. The path quality estimator 515 may compare the variance in the packet losses to a threshold. If the variance of the packet losses in the communication path 530*a-n* is determined to be greater than the threshold, the path quality estimator 515 may determine random as the network disruption type in the communication path 530*a-n*. Conversely, if the variance of the packet losses in the communication path 530*a-n* is determined to be less than or equal to the threshold, the path quality estimator 515 may determine bursty as the network disruption type in the communication path 530*a-n*.

In some embodiments, the path quality estimator 515 may calculate or determine a maximum moving average in the distribution over a subset window (e.g., 10 seconds) within the time period used to determine the distribution. The path quality estimator 515 may compare the maximum moving average packet loss to a threshold. A low moving average in the packet losses may be indicative of a random network disruption, whereas a high moving average in the packet losses may be indicative of a bursty network disruption. If the maximum moving average in packet losses in the communication path 530*a-n* is determined to be greater than the threshold, the path quality estimator 515 may determine bursty as the network disruption type in the communication path 530*a-n*. Conversely, if the maximum moving average in packet losses in the communication path 530*a-n* is determined to be less than or equal to the threshold, the path quality estimator 515 may determine random as the network disruption type in the communication path 530*a-n*.

With the path qualities 555 for the set of communication paths 530*a-n* determined, the path quality estimator 515 may sort the set of communication paths 530*a-n* by path qualities 555. In some embodiments, the path quality estimator 515 may determine the path quality 555 based on a combination (e.g., a weighted average) of the determined network bandwidth, latency, variation in packet delay, packet loss rate, error rate, and the distribution of the packet losses among other measures. The set of communication paths 530a-n may be sorted or ranked in ascending or descending path quality 555. In some embodiments, the set of communication paths 530a-n may be sorted or ranked in accordance to the combination of measures. In some embodiments, the path quality estimator 515 may use any number of sorting algorithms (e.g., quick sort, merge sort, bubble sort, binary tree sort) to rank the set of communication paths 530a-n by the path quality 555. In some embodiments, the path quality estimator 515 may generate a set of path qualities to provide to the path selector 520. The set of path qualities may include the set of communication paths 530a-n sorted by the estimated path qualities 555 for forwarding the packets 540 via the respective communication path 530a-n. Upon generation, the path quality estimator 515 may provide the set of communication path qualities for the corresponding set of communication paths 530a-n to the path selector 520.

Based on the sensitivity level 550 of the application 545 and the path qualities 555 of the communication paths 530a-n, the path selector 520 may select one of the communications paths 530a-n. In some embodiments, the path selector 520 may identify the sensitivity level 550 for the application 545 running on the client 102. As described previously, the sensitivity levels 550 may include: a low-sensitivity level for applications 545 with bulky traffic type, a medium-sensitivity level for applications 545 with interactive traffic type, and a high-sensitivity level for applications 545 with real-time traffic type. Furthermore, the path quality 555 for each communication path 530a-n may include the network bandwidth, latency, variation in packet delay, packet loss rate, error rate, and the distribution of the packet losses, or any combination thereof. The selection 560 of the communication paths 530a-n may depend on the sensitivity level 550 of the application 545.

If the sensitivity level 550 for the application 545 is identified as the low-sensitivity level, the path selector 520 may select the communication path 530a-n with the highest path quality 555 to communicate the packets 540 for the application 545. The selection 560 of the communication path 530a-n may be independent on whether the communication 530a-n has bursty or random network disruption. In some embodiments, the path selector 520 may select the communication path 530a-n with the lowest average packet loss. In some embodiments, the path selector 520 may select the communication path 530a-n with the highest network bandwidth. In some embodiments, the path selector 520 may select the communication path 530 with the lowest latency. In some embodiments, the path selector 520 may select the communication path 530a-n with the least variation in packet delay. In some embodiments, the path selector 520 may select the communication path 530a-n with the lowest error rate.

On the other hand, if the sensitivity level 550 for the application 545 is identified as the medium sensitivity level or the high-sensitivity level, the path selector 520 may select the communication path 530a-n based on the distributions of packet losses. Based on the sensitivity level 550, the path selector 520 may determine or set a threshold value for the path quality 555 for selecting one of the communication paths 530a-n. The threshold value may represent the path quality or amount of network disruption tolerable in the communication path 530a-n for the functioning of the application 545, and as such may depend on the sensitivity level 550 of the application 545. In some embodiments, the threshold value may indicate an amount of tolerable variance or moving average in the distribution of packet losses in the communication path 530a-n for the proper functioning of the application 545. Applications 545 reliant on real-time traffic may have less tolerance for bursty network disruptions, whereas applications 545 reliant on interactive traffic may have higher tolerance for bursty network disruptions. The threshold value for applications 545 with interactive traffic may be set at a greater value than the threshold value for applications 545 with real-time traffic. For example, the threshold value for interactive traffic may be 15 packets lost over 1 minute, whereas the threshold value for real-time traffic may be 5 packets lost over 1 minute. In some embodiments, the path selector 520 may select the communication path 530a-n based on the distributions of packet losses for applications 545 with low-sensitivity level. The threshold value for applications 545 with bulky traffic may be set at a lower value than the threshold value for applications 545 with interactive traffic.

With the setting of the threshold value based on the sensitivity level 550, the path selector 520 may compare the path quality 555 of each communication path 530a-n with the threshold value. Based on the comparison, the path selector 520 may identify a subset of communication paths 530a-n with path qualities 555 greater than the threshold value. The path selector 520 may determine whether the subset is null. If the subset is determined to be null, the path selector 520 may select the communication path 530a-n with the highest path quality 555, such as lowest average packet loss, highest network bandwidth, lowest latency, least variation in packet delay, or lowest error rate. Otherwise, if the subset is determined to be not null, the path selector 520 may select one communication path 530a-n from the subset based on the distribution of packet losses.

For each communication path 530a-n of the subset, the path selector 520 may identify whether the network disruption type is random or bursty as determined by the path quality estimator 515. The path selector 520 may identify a set of communication paths 530a-n determined as having random network disruption and a set of communication paths 530a-n determined as having bursty network disruption. The path selector 520 may determine whether the set of communication paths 530a-n determined as having random network disruption is null. If the set of communication paths 530a-n determined as having random network disruption is not null (empty set), the path selector 520 may select the communication path 530a-n with the highest path quality 555, such as lowest average packet loss, highest network bandwidth, lowest latency, least variation in packet delay, or lowest error rate. On the other hand, if the set of communication paths 530a-n determined as having random network disruption is null (empty set), the path selector 520 may select the communication path 530a-n based on the variance or the moving mean of the packet losses in the distribution. In some embodiments, the path selector 520 may select the communication path 530a-n with the lowest variance in the distribution of packet losses. In some embodiments, the path selector 520 may select the communication path 530a-n with the lowest moving mean of packet losses in the distribution.

With the selection 560 of the communication path 530a-n, the routing engine 525 may communicate the packets 540 between the client 102 and the server 106 via the communication path 530a-n. In some embodiments, the routing engine 525 may forward the packets 540 through the other appliance 200 between the client 102 and the server 106 via the communication path 530a-n. For example, if the present instance of the routing engine 525 is on the client-side appliance 200a, the other appliance 200 may be the server-side appliance 200b. On the other hand, if the present instance of the routing engine 525 is on the server-side appliance 200b, the destination device may be the client-side appliance 200a. In some embodiments, the routing engine 525 may initiate or establish the communication path 530a-n, responsive to the selection 560 of the communication path 530a-n. The communication path 530a-n may be initiated and established by the routing engine 525 in accordance with any number of communication protocols.

In communicating the packets 540 via the selected communication path 530a-n, the routing engine 525 may maintain a buffer to store the packets 540 to be re-transmitted between the client 102 and the server 106. As the packets 540 are received from the client 102 or the server 106, the routing engine 525 may send the packets 540 to the destination device and to store the packets 540 into the buffer. While forwarding the packets 540 via the selected communication path 530a-n, the routing engine 525 may also monitor for a disruption event in the communication path 530a-n. The disruption event may include a packet loss, among others. In some embodiments, the routing engine 525 may wait for a response packet upon sending the packet 540 to the destination device (e.g., the other appliance 200, the client 102, or the server 106). For each packet 540 sent, the routing engine 525 may maintain a timer to measure a time elapsed since the sending of the packet 540 to wait for the response packet to the packet 540 from the destination device. The routing engine 525 may compare the elapsed time to a time threshold (e.g., a set time for timeout). If while waiting the elapsed time becomes greater than the time threshold, the routing engine 525 may determine an occurrence of a packet loss for the packet 540. In some embodiments, routing engine 525 may also determine an occurrence of a disruption event in response to determining the occurrence of the packet loss. In some embodiments, the routing engine 525 may maintain a counter to keep track of a number of lost packets over a time window (e.g., 15 to 30 seconds). The routing engine 525 may compare the number of lost packets over the time window to a threshold number. If the number of packet losses over the time window is greater than the threshold number, the routing engine 525 may determine the occurrence of the disruption event.

In response to detecting the disruption event, the routing engine 525 may access the buffer to retrieve the stored packets 540. To minimize the effect of the disruption event to the client 102 or the server 106, the routing engine 525 may re-transmit the stored packets 540 retrieved from the buffer via the communication path 530a-n. In some embodiments, the routing engine 525 may select a subset of stored packets 540 from the buffer to be re-transmitted via the communication path 530a-n. The routing engine 525 may determine or set a number for the subset of stored packets 540 based on the disruption event. In some embodiments, the routing engine 525 may determine or set the number for the stored packets 540 to be retransmitted based on the number of lost packets over the time window. The higher the number of lost packets, the higher the number of packets 540 stored in the buffer may be retransmitted via the communication path 530a-n. Conversely, the lower the number of lost packets, the lower the number of packets 540 stored in the buffer may be retransmitted via the communication path 530a-n. With the number of packets to be transmitted determined, the routing engine 525 may identify the subset of packets 540 stored in the buffer. The subset of packets 540 may be the previous number of packets 540 transmitted prior to the detection of the disruption event. Once identified, the routing engine 525 may send the subset of packets 540 via the communication path 530a-n. In this manner, the effects of any network disruption within the communication path 530a-n may be hidden or minimized from the client 102 or the server 106.

In some embodiments, the routing engine 525 may provide or transmit a loss feedback indicator to the client 102 or the server 106 in response to detecting the disruption event. The loss feedback indicator may denote the occurrence of the disruption event in the communication path 530a-n. The routing engine 525 may append the loss feedback indicator to one of the packets 540 to be communicated between the client 102 and the server 106. In some embodiments, the routing engine 525 may append or insert the loss feedback indicator into the body of the packet 540. In some embodiments, the routing engine 525 may append or insert the loss feedback indicator into the body of one of the packets 540 retransmitted from the buffer. Using the loss feedback indicator, the client 102 and the server 106 may perform countermeasures in response to the detection of the disruption event. The countermeasures may include retransmission of previous packets 540 and accepting packets 540 out of sequence order, among others.

Subsequent to initiation of the communication of packets 540 via the selected communication path 530a-n, the selection of the communication path 530a-n for the packets 540 may change to another communication path 530a-n. The path quality estimator 515 may continue to monitor the communication paths 530a-n. The path quality estimator 515 may continue to determine the path quality 555 of each communication path 530a-n in the manner as previously detailed herein. The path qualities 555 of the communication paths 530a-n in the intermediary network 104' may change after the initiation of the communication of packets 540. In some embodiments, the determination of the path quality 555 by the path quality estimator 515 may be performed periodically (e.g., at regular time intervals). Based on the new path qualities 555 of the communication paths 530a-n and the sensitivity level 550 of the application 545, the path selector 520 may select another communication path 530a-n different from the previously selected communication path 530a-n in the manner as detailed herein above. With the selection of a new communication path 530a-n, the routing engine 525 may switch over from the previously selected communication path 530a-n to the new communication path 530a-n to communicate subsequent packets 540 between the client 102 and the server 106.

Figure 6:
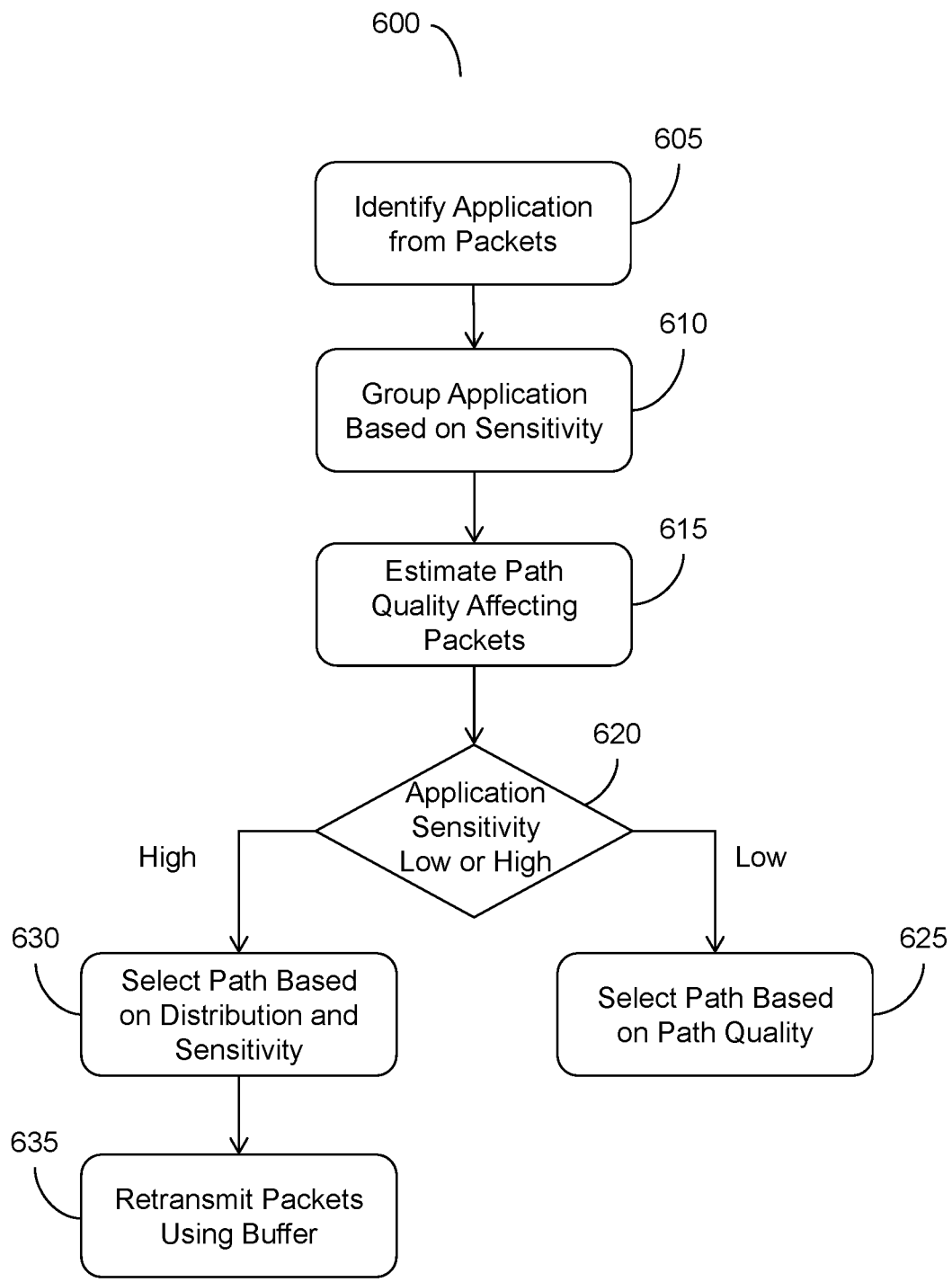
FIG. 6 is a flow diagram of a method of selecting connection paths.

Referring now to FIG. 6, depicted is a flow diagram for a method 600 of selecting communication paths for applications sensitive to bursty packet drops. The functionalities of method 600 may be implemented using, or performed by, the components described in FIGS. 1-5B, such as the appliance 200a-n. In brief overview, an intermediary device may identify an application from packets (605). The device may group the application based on sensitivity (610). The device may estimate a path quality affecting the packets (615). The device may determine whether the application sensitivity is low or high (620). If the application sensitivity is determined to be low, the device may select the path based on path quality (625). On the other hand, if the application sensitivity is high, the device may select the path based on a distribution of packet losses and the sensitivity of the application (630). The device may retransmit the packets using buffer (635).

In further detail, an intermediary device may identify an application from packets (605). The device may be deployed intermediary between a client and a server. The device may parse the packets to identify a header and a body from the packet. The header may include a source or a destination address corresponding to a server hosting resources for a particular application. Using the source or the destination address in the header of the packet, the device may identify the application corresponding to the server hosting resources for the application. The body may include payload data containing metadata. The metadata may include an identifier for the application. Using the metadata in the body of the packet, the device may identify the application corresponding to the identifier.

The device may group the application based on a sensitivity (610). The sensitivity may indicate a degree to which operations of the application may be affected due to bursty packet losses. The device may determine the traffic type of the application using a list of applications designating the traffic type. The traffic type may include real-time traffic and bulky traffic. Applications reliant on real-time traffic may have high sensitivity to bursty packet losses. Applications reliant on bulky traffic may have low sensitivity.

The device may estimate a path quality affecting the packets (615). The network between the client and the server may include a set of paths for communicating the packets. The path quality for each path may include a network bandwidth, a latency, a variation in packet delay, a packet loss rate, and an error rate, among others. The path quality may also indicate an amount of bursty packet losses in the path. The device may also determine a distribution of packet losses over a period of time. The device may send test packets and wait for response packets to measure the number and time of packet losses over the period of time. Using the number and time of packet losses, the device may determine the distribution. The device may determine a variance in the packet losses over the set period of time from the distribution.

The device may determine whether the application sensitivity is low or high (620). Depending on a traffic type for the packets of the application, bursty packet losses may impact the operations of the applications differently. The operations of applications with low sensitivity may be less susceptible to interruptions due to bursty packet losses. The operations of applications with high sensitivity may be more susceptible to interruptions originating from bursty packet losses.

If the application sensitivity is determined to be low, the device may select the path based on path quality (625). In this case, the selection of the path may be independent of whether the path itself has bursty packet loss, as the application is determined to be low-sensitivity to such packet losses. The device may select the path with the highest network bandwidth, lowest latency, least variation in packet, lowest packet loss rate, and lowest error rate, among others, or any combination thereof.

On the other hand, if the application sensitivity is high, the device may select the path based on the distribution of packet losses and the sensitivity of the application (630). The device may compare the path quality of each path to a threshold. Using the comparison, the device may identify a subset of paths with path qualities above the threshold. From the subset of paths, the device may identify the variance in the distribution of packet losses for each path. The device may compare the variance of each path to a threshold. The threshold may be set based on the sensitivity of the application. A high variance in packet losses above the threshold may indicate the presence of bursty packet drops in the path. A low variance in packet losses below the threshold may indicate the relative lack of bursty packet drops in the path. The device may select one of the paths with a variance below the threshold.

The device may retransmit the packets using a buffer (635). With the selection of the path, the device may forward the packets via the selected path. In forwarding the packets, the device may store the packets into the buffer. The device may monitor for a disruption event (e.g., several packet losses within a period of time) in the path. In response to detecting the disruption event, the device may retransmit the packets from the buffer to the client or the server.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C #, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

It will be further understood that various changes in the details, materials, and arrangements of the parts that have been described and illustrated herein may be made by those skilled in the art without departing from the scope of the following claims.

We claim:

1. A method of selecting connection paths, comprising:
identifying, by a device intermediary to a client and a server, an application for which one or more packets are to be communicated between the client and the server;
determining, by the device, a sensitivity level of the application, the sensitivity level indicating application performance in response to a network disruption affecting the one or more packets;
determining, by the device, for each of a plurality of paths between the client and the server for communicating the one or more packets, a path quality for the path indicating a likelihood that the network disruption affects the one or more packets;
selecting, by the device, from the plurality of paths between the client and the server, a path for communicating the one or more packets based on the sensitivity level of the application and the path quality;
communicating, by the device, the one or more packets between the client and the server via the selected path;
storing, on a buffer of the device, the one or more packets transmitted between the client and the server via the selected path responsive to determining that the sensitivity level of the application satisfies a first sensitivity level greater than a second sensitivity level;
selecting, by the device, based on a number of packets lost over a predefined time window, a subset of the one or more packets maintained on the buffer; and
retransmitting, by the device, the subset of the one or more packets to at least one of the client and the server via the selected path, at least one of the subset of the one or more packets including a loss feedback indicator to cause at least one of the client or the server to perform a countermeasure, the countermeasure including accepting the one or more packets out of sequence.

2. The method of claim 1, wherein identifying the application further comprises parsing the one or more packets received by the device to identify a traffic type for the application;
wherein determining the sensitivity level of the application further comprises determining the sensitivity level of the application from a plurality of sensitivity levels based on the traffic type, each of the plurality of sensitivity levels corresponding to one of a plurality of traffic types.

3. The method of claim 1, wherein determining the sensitivity level further comprises associating the application to the sensitivity level of a plurality of sensitivity levels based on a traffic type of the application, the plurality of sensitivity levels including: a low-sensitivity level for traffic types with bulk data transfers, a medium-sensitivity level for traffic types with interactive network traffic, and a high-sensitivity level for traffic types with real-time network traffic.

4. The method of claim 1, wherein determining the path quality further comprises calculating, for each of the plurality of paths, an average packet loss for the path by smoothing a packet loss distribution indicating a rate of the one or more packets dropped over a predefined time period; and
wherein selecting the path from the plurality of paths further comprises selecting the path corresponding to a lowest average packet loss.

5. The method of claim 1, further comprising
setting, by the device, a predetermined threshold for selection of the path from the plurality of paths for the application based on the sensitivity level;
comparing, by the device, for each of the plurality of paths, the path quality to the predetermined threshold; and
wherein selecting the path from the plurality of paths further comprises selecting the path responsive to determining that the path quality for the path is greater than the predetermined threshold.

6. The method of claim 1, wherein determining the path quality further comprises estimating, for each of the plurality of paths, the path quality based on at least one of: a packet loss distribution indicating a rate of the one or more packets dropped over a time period across the path; a latency indicating a delay rate in a transmission of the one or more packets across the path; and a jitter indicating a variance in the transmission of the one or more packets across the path.

7. The method of claim 1, further comprising:
detecting, by the device, while communicating the one or more packets, a disruption event interrupting communication of the one or more packets via the selected path between the client and the server; and
providing, by the device, responsive to detecting the disruption event in the selected path, the loss feedback indicator of the disruption event in a body of at least one of the subset of the one or more packets to cause at least one of the client or the server to perform the countermeasure.

8. The method of claim 1, further comprising:
determining, by the device subsequent to communicating via the selected path, for each of the plurality of paths, a second path quality for the path indicating the likelihood that the network disruption affects the one or more packets;
selecting, by the device, from the plurality of paths, a second path for communicating the one or more packets based on the sensitivity level of the application to the network disruption and the second path quality; and
switching, by the device, from the selected path to the second path for communicating subsequent packets between the client and the server.

9. The method of claim 1, wherein communicating the one or more packets further comprises communicating the one or more packets via the selected path between the client and the server and through the device and a second device, the second device deployed intermediary between the device and the at least one of the client and the server.

10. A system for selecting connection paths, comprising:
a device intermediary to a client and a server, the device having one or more processors coupled with memory, configured to:
identify an application for which one or more packets are to be communicated between the client and the server;
determine a sensitivity level of the application to a network disruption affecting the one or more packets;
estimate, for each of a plurality of paths between the client and the server for communicating the one or more packets, a path quality for the path indicating a likelihood that the network disruption affects the one or more packets;

select, from the plurality of paths between the client and the server, a path for communicating the one or more packets based on the sensitivity level of the application and the path quality;

communicate the one or more packets between the client and the server via the path selected based on the sensitivity level and the path quality;

store, on a buffer of the device, the one or more packets transmitted between the client and the server via the selected path responsive to determining that the sensitivity level of the application satisfies a first sensitivity level greater than a second sensitivity level;

select, based on a number of packets lost over a predefined time window, a subset of the one or more packets maintained on the buffer; and retransmit the subset of the one or more packets to at least one of the client and the server via the selected path, at least one of the subset of the one or more packets including a loss feedback indicator to cause at least one of the client or the server to perform a countermeasure, the countermeasure including accepting the one or more packets out of sequence.

11. The system of claim 10, wherein the device is further configured to parse the one or more packets received by the device to identify a traffic type for the application; and wherein the device is further configured to determine the sensitivity level of the application from a plurality of sensitivity levels based on the traffic type, each of the plurality of sensitivity levels corresponding to one of a plurality of traffic types.

12. The system of claim 10, wherein the device is further configured to group the application to the sensitivity level of a plurality of sensitivity levels based on a traffic type of the application, the plurality of sensitivity levels including: a low-sensitivity level for traffic types with bulk data transfers, a medium-sensitivity level for traffic types with interactive network traffic, and a high-sensitivity level for traffic types with real-time network traffic.

13. The system of claim 10, wherein the device is further configured to:

calculate, for each of the plurality of paths, an average packet loss for the path by smoothing a packet loss distribution indicating a rate of the one or more packets dropped over a time period; and determine the path from the plurality of paths corresponding to a lowest average packet loss.

14. The system of claim 10, wherein the device is further configured to:

set a predetermined threshold for selection of the path from the plurality of paths for the application based on the sensitivity level;

compare, for each of the plurality of paths, the path quality to the predetermined threshold; and select the path from the plurality of paths, responsive to determining that the path quality for the path is greater than the predetermined threshold.

15. The system of claim 10, wherein the device is further configured to estimate, for each of the plurality of paths, the path quality including at least one of: a packet loss distribution indicating a rate of the one or more packets dropped over a time period across the path; a latency indicating a delay rate in a transmission of the one or more packets across the path; and a jitter indicating a variance in the transmission of the one or more packets across the path.

16. The system of claim 10, wherein the device is further configured to:

detect, while communicating the one or more packets, a disruption event interrupting communication of the one or more packets via the path between the client and the server; and provide, responsive to detecting the disruption event in the path, the loss feedback indicator of the disruption event in a body of at least one of the subset of the one or more packets to cause at least one of the client or the server to perform the countermeasure.

17. The system of claim 10, wherein the device is further configured to:

estimate, subsequent to communicating via the selected path, for each of the plurality of paths, a second path quality for the path indicating to the likelihood that the network disruption affects the one or more packets;

select, from the plurality of paths, a second path for communicating the one or more packets based on the sensitivity level of the application to the network disruption and the second path quality and to switch over from the selected path to the second path for communicating subsequently received packets between the client and the server.

18. The system of claim 10, wherein the device is further configured to communicate the one or more packets via the path between the client and the server through the device and a second device, the second device deployed intermediary between the device and the at least one of the client and the server.

* * * * *